United States Patent [19]

Suzuki et al.

[11] Patent Number: 4,993,382
[45] Date of Patent: Feb. 19, 1991

[54] INSERT FOR AN INDIRECT INJECTION DIESEL ENGINE

[75] Inventors: Makoto Suzuki; Toshio Mizobuchi, both of Kumagaya, Japan

[73] Assignee: Kabushiki Kaisha Riken, Tokyo, Japan

[21] Appl. No.: 442,610

[22] Filed: Nov. 29, 1989

[30] Foreign Application Priority Data

Feb. 22, 1989 [JP] Japan .................................. 1-42469
Aug. 16, 1989 [JP] Japan .................................. 1-210064

[51] Int. Cl.$^5$ ...................... F02B 19/00; F02B 75/08; F02B 77/02
[52] U.S. Cl. ........................... 123/254; 123/270
[58] Field of Search ............... 123/254, 255, 270, 271, 123/668

[56] References Cited

U.S. PATENT DOCUMENTS

| 3,044,454 | 7/1962 | Sutton | 123/254 |
|---|---|---|---|
| 4,008,051 | 2/1977 | Cadle | 123/668 |
| 4,080,938 | 3/1978 | Noguchi et al. | 123/271 |
| 4,237,845 | 12/1980 | Kato et al. | 123/271 |
| 4,337,736 | 7/1982 | Rasch et al. | 123/668 |
| 4,511,612 | 4/1985 | Hüther et al. | 123/270 |
| 4,522,171 | 6/1985 | Dworak et al. | 123/270 |

FOREIGN PATENT DOCUMENTS

| 59-301 | 1/1984 | Japan . | |
|---|---|---|---|
| 0046317 | 3/1984 | Japan | 123/270 |
| 60-9860 | 1/1985 | Japan . | |
| 62-112762 | 5/1987 | Japan . | |
| 63-47346 | 2/1988 | Japan . | |

Primary Examiner—Tony M. Argenbright
Assistant Examiner—Robert E. Mates
Attorney, Agent, or Firm—Finnegan, Henderson, Farabow, Garrett & Dunner

[57] ABSTRACT

An insert for an indirect injection diesel engine having a cylindrical body having a top wall and a hole formed in the top wall through which fuel and air may be injected into the interior of the insert. A heat resistant alloy layer or welding overlay is formed surrounding at least one of the upper and lower ends of the hole. By completely surrounding the hole openings with the alloy, machining of the hole is made easier.

2 Claims, 8 Drawing Sheets

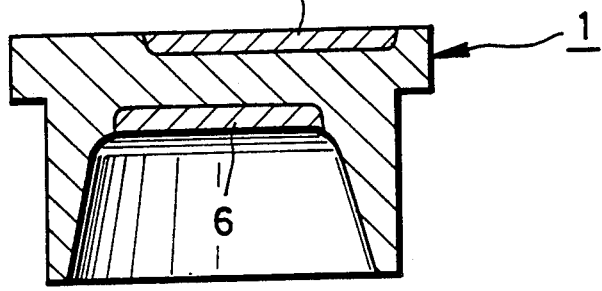
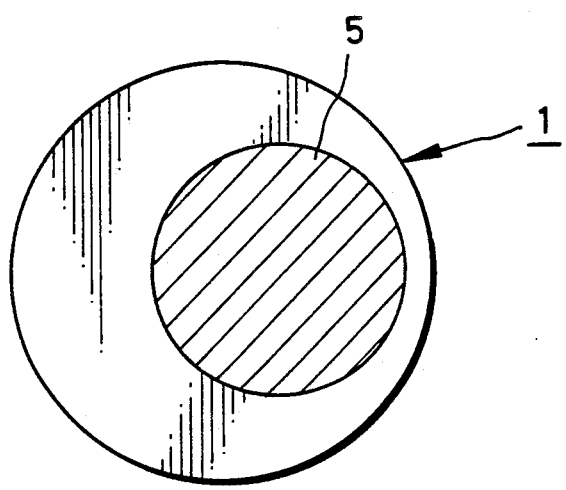
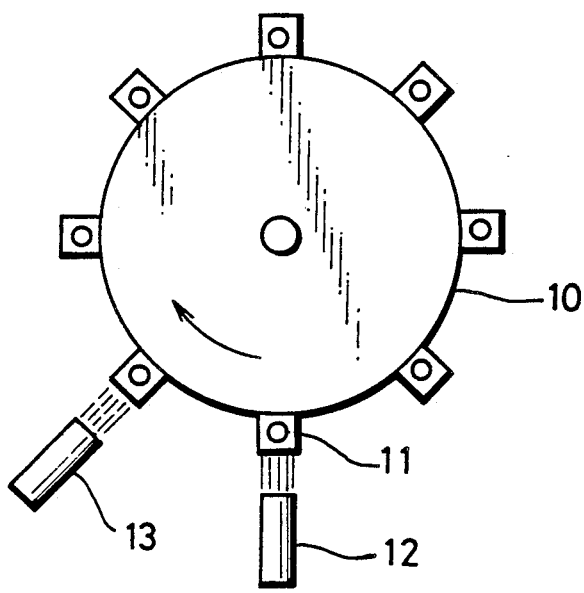
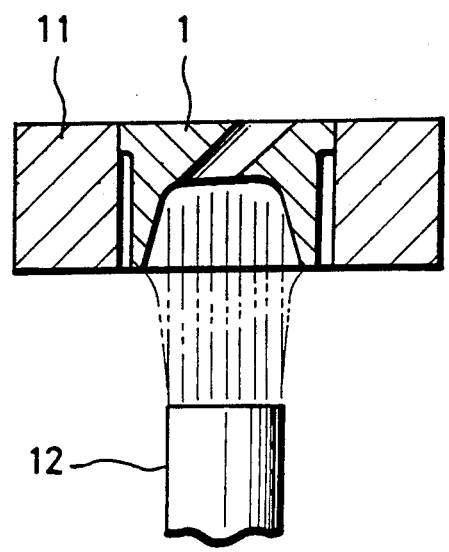

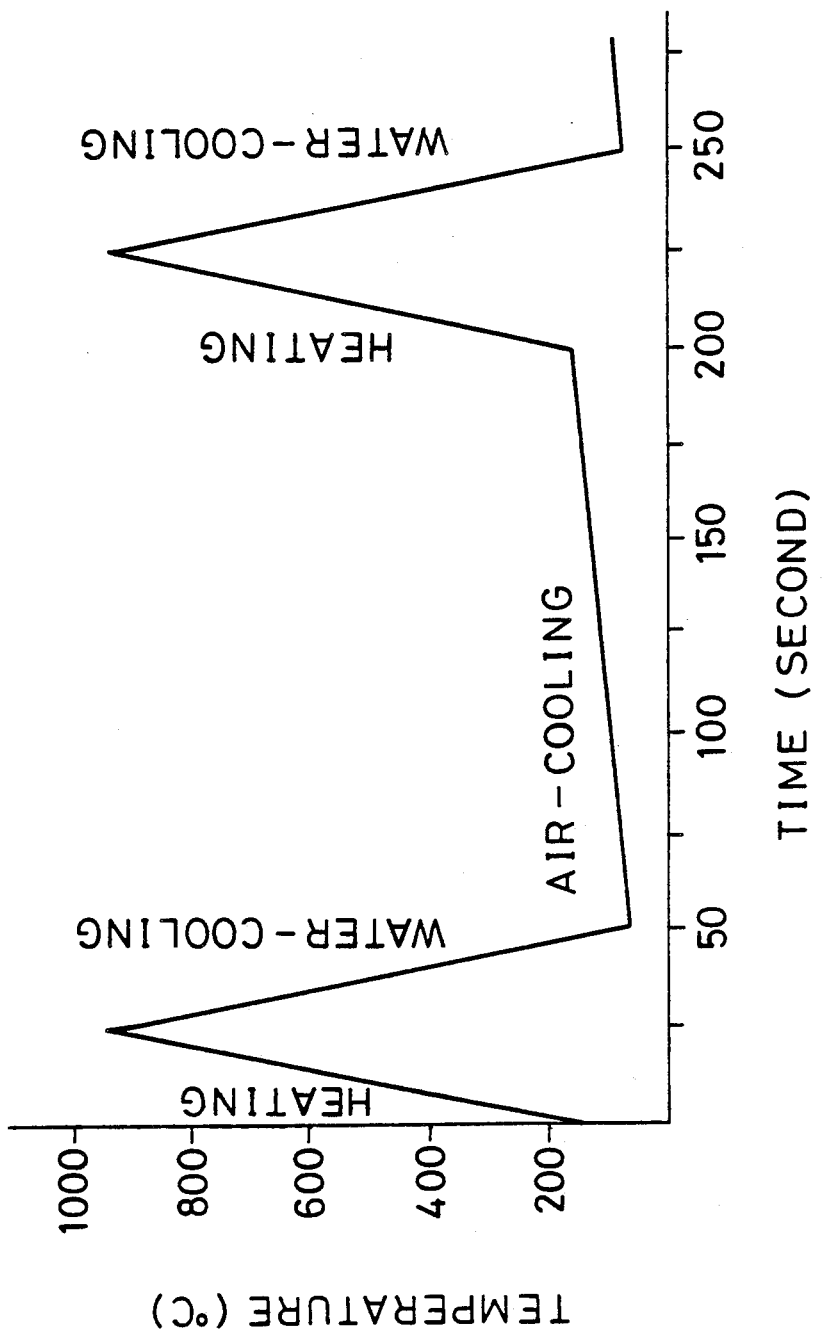

INSERT FOR AN INDIRECT INJECTION DIESEL ENGINE

FIELD OF THE INVENTION

This invention relates to the improvement of an insert for an indirect injection diesel engine, particularly to such an insert wherein a heat resistant alloy layer or welded overlay having good machining, high heat resistance and thermal fatigue resistance is secured to at least one of the upper and lower ends of a fuel injection hole.

Lost-wax casting, machining, and forging are used in the prior art in preparing metallic inserts. Martensite based heat resistant steels such as SUH3 and SUH616 and super heat resistant steels such as NIMONIC80A and LCN-155 are used, because high resistance to thermal fatigue is required.

The demand for high speed rotation, compactness and improved heat efficiency for diesel engines has recently increased. Particularly, the temperature and pressure in the combustion chamber have become greater owing to the popularity of EGR because of its waste gas control. Damage is most severe to the peripheral areas around openings of the fuel injection hole on the insert, because gases having high temperature and high pressure are injected through the hole at great speed and the temperature of the peripheral areas becomes locally higher. The materials described above cannot be used for such a high load engine. Inserts for use in a high load engine are disclosed in Japanese patent publications Shô 62-112762 and Shô 63-47346, wherein a super heat resistant alloy layer or welded overlay is used for the insert or at the acute angle areas around openings of the hole, which will be abnormally heated. However, it is necessary to move the welding nozzle correctly along the shape of the acute angle areas for welding the specified material to these areas by the methods shown in the prior publications, which is a skilful and time-consuming process. When the hole is being formed and the drill enters the boundary between the insert body and the welding area, high precision drilling is difficult to achieve and the drill is subject to excessive wear. Furthermore, the dangerous condition of the welded overlay detaching from the insert may occur during operation of the engine.

The primary object of this invention is to provide an insert having good machining and increased resistance to thermal fatigue which is produced by the high speed flow of gas at a high temperature and pressure.

A further object of the invention is to provide an inexpensive insert having improved durability and low thermal expansion.

SUMMARY OF THE INVENTION

To achieve the objects mentioned above, the invention provides an insert for an indirect injection diesel engine comprising a cylindrical wall and a top wall formed of heat resistant steel with a hole therethrough, at least one of the upper and lower ends of the hole being surrounded by an alloy layer or welded overlay having a greater heat resistance than the top wall.

Preferably the heat resistant steel forming the top wall is a martensite based alloy such as SUS403.

It should be understood that any suitable alloy having high resistance to thermal fatigue may be used to provide the alloy layer or welded overlay. However, it is preferable to use either an alloy referred to herein as "alloy A" and comprising by weight:
C: 0.5% or less,
Si: 1.0% or less,
Mn: 2.0% or less,
Ni: 5-15%,
Cr: 10-30%,
W: 10-20%,
Fe: 5-25%, and
Co: making up the balance, with some inevitable impurities; or an alloy referred to herein as "alloy B" and comprising by weight:
C: 0.15% or less,
Si: 0.5% or less,
Mn: 1.0% or less,
Cr: 10-30%,
Mo: 3-7%,
W: 3-10%,
Fe: 5-25%, and
Ni: making up the balance, with some inevitable impurities. The reasons for the proportions of heat resistant alloy components preferred in this invention are as follows.

ALLOY A

C: When carbides form by combination of C with Cr and W, the hardness of the alloy is increased and it becomes difficult to machine. Accordingly, the upper limit of the proportion of C is 0.5%.

Si: The oxidation resistance of the alloy is improved by adding Si. However, when excessive amounts of Si are added, brittleness occurs and thermal shock resistance is lowered. Accordingly, the proportion of Si is limited to 1.0% or less.

Mn: The presence of Mn is effective for the improvement of creep strength. However, when excessive amounts of Mn are present, high temperature oxidation resistance is degraded. Therefore the proportion of Mn is limited to 2.0% or less.

Ni: The addition of Ni strengthens the alloy by solid solution of Ni in the austenite base and when W coexists with Ni, the effect is further increased. However, when 5% or less of Ni is present, the effect is small; above 15% the effect is not substantially further increased. When excessive amounts of Ni are present, the resistance to S-attack becomes poor. Accordingly, the proportion of Ni is limited to the range 5-15%.

Cr: Cr is the critical component for determining the oxidation resistance of the alloy at high temperatures. When Cr is present at 10% or less, the oxidation resistance is insufficient and for proportions of Cr in excess of 30%, oxidation resistance is not further improved to a significant degree. Therefore, the proportion of Cr is limited to the range 10-30%.

W: In the same manner as Ni, W strengthens the alloy by solid solution of W in the austenite base. However, when W is present at 10% or less, the effect is small, and when present at over 20%, the machinability of the alloy is degraded. Also the addition of large amounts of W is not economical. In consequence, the proportion of W is limited to 10-20%.

Fe: Fe may constitute up to 25% of the alloy without degradation of its resistance to damage. However, when the fraction of Fe is far less, machining of the alloy becomes difficult. The proportion of Fe is limited to between 5% and 25% by considerations of the cost.

ALLOY B

C: When carbides form by combination of C with Cr, W and Mo, the toughness of the alloy is degraded, so the proportion of C is limited to 0.15% or less.

Si: The oxidation resistance of the alloy is improved by adding Si. However, when excessive amounts of Si are added, brittleness occurs and thermal shock resistance is lowered. Accordingly, the proportion of Si is limited to 0.5% or less.

Mn: The presence of Mn is effective for the improvement of creep strength. However, when excessive amounts of Mn are present, the oxidation resistant property of the alloy is degraded. Therefore, the proportion of Mn is limited to 1.0% or less.

Cr: Cr is the critical component for determining the oxidation resistance at high temperature. When Cr is present at 10% or less, the oxidation resistance is insufficient, and if Cr is present at 30% or more, the effect on the oxidation resistance is not particularly improved further. The presence of more than 30% of Cr is not economical, so the proportion of Cr is limited to 10-30%.

Mo: Mo strengthens the alloy by solid solution of Mo in the austenite base. When 3% or less of Mo is added, the effect of the Mo is slight, and when more than 7% of Mo is added, the effect on oxidation resistance is not significantly further increased. Also the addition of large amounts of Mo is not economical. Therefore, the proportion of Mo is limited to 3-7%.

W: As with Mo, the presence of W also strengthens the alloy by solid solution of W in the austenite base. Particularly when W coexists with Mo, the effect of addition of W is remarkable. However, when 3% or less is added, the effect does not appear and when W over 10% is added, toughness becomes degraded because the α phase intermetallic compounds are produced, which are the origin of toughness degradation. Hence, the proportion of W is limited to 3-10%.

Fe: Fe may constitute up to 25% of the alloy without degradation of its damage resistant property. However, when the fraction of Fe is far less, machining the alloy becomes difficult. The proportion of Fe is limited to 5-25% by considerations of the cost.

The alloy layer or welded overlay of this invention is secured to the whole peripheral area surrounding the openings of the hole. However, it is possible to locate the alloy layer or welded overlay around only the upper or the lower opening of the hole. Also, it is possible to use the preferred alloy A or B or some other alloy at each of the upper and lower ends of the hole in any combination.

BRIEF DESCRIPTIONS OF THE DRAWINGS

Other features and advantages of the invention will become evident from the description which follows, best understood when considered in conjunction with the accompanying drawings.

FIG. 5 is a vertical cross section after welding the alloy layer.

FIG. 6 is a plan view of FIG. 5.

FIG. 7 is a schematic view of test apparatus for thermal fatigue.

FIG. 8 is a schematic view of the sample holders of the test apparatus, showing the testing method.

FIG. 9 is a graph showing heating and cooling cycles of the thermal fatigue test.

DETAILED DESCRIPTION OF THE INVENTION

Figure 17:
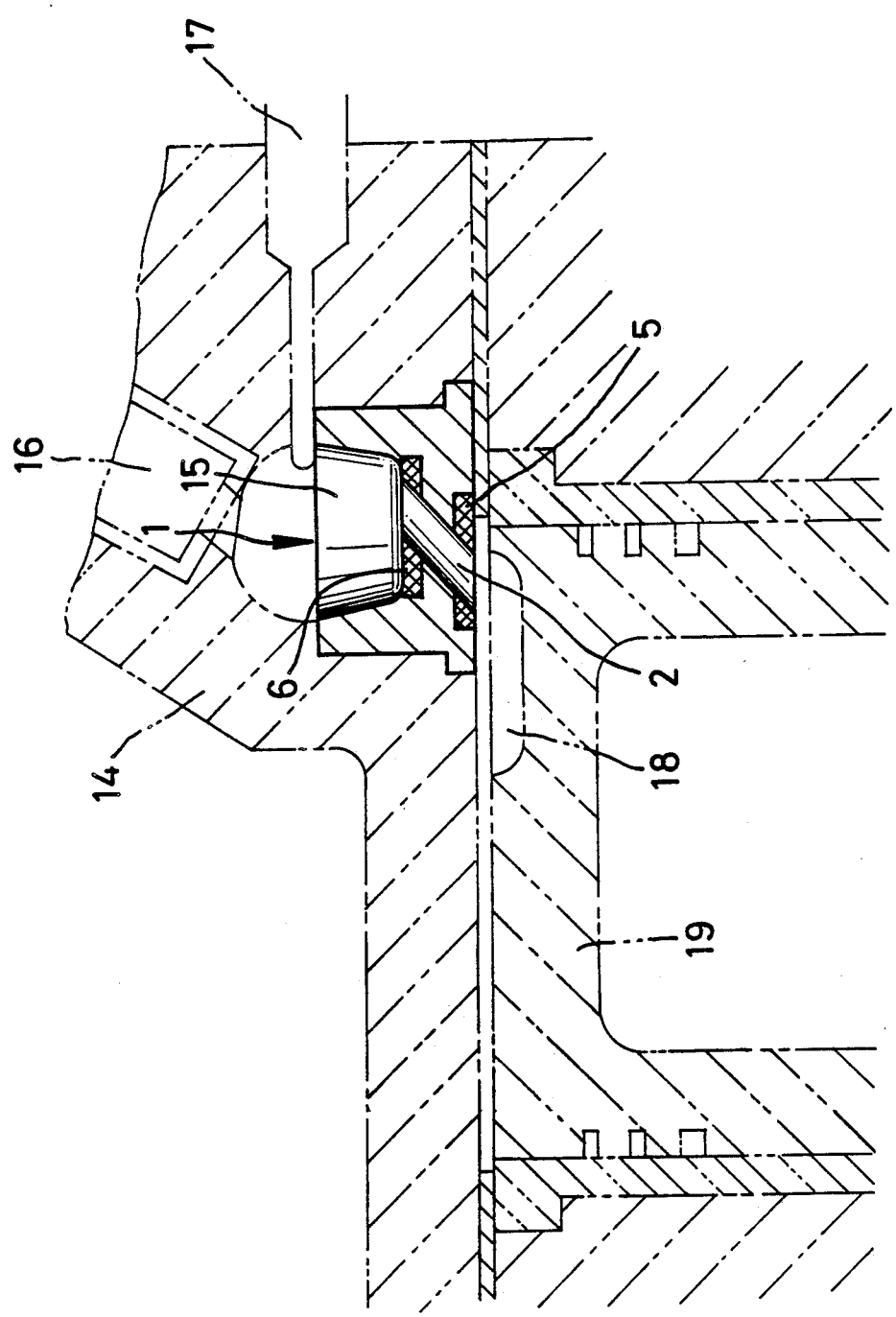
FIG. 17 is a vertical cross section of an indirect injection diesel engine including an insert according to the invention.

As shown in FIG. 17, an insert (1) is mounted on a cylinder head (14) and an opening of a swirl chamber (15) is directed to an fuel injection nozzle (16) and a pre-heat plug (17). The swirl chamber (15) communicates with a combustion chamber (18) through a firering hole (2).

Air in the combustion chamber (18) is compressed during a compression stroke of the piston (19) and the compressed air is introduced into the swirl chamber (15) through the hole (2) so that a swirl of the compressed air is produced in the swirl chamber (15) and fuel injected into the swirl of compressed air in the swirl chamber is vaporized. The fuel, combined with the air, is automatically fired and pre-burned.

As a result, the pressure in the swirl chamber rapidly increases and the increased pressure is transferred to the combustion chamber (18) through the fire-ring hole (2). Further combustion of fuel and air occurs in the combustion chamber and initiates the expansion stroke.

Because the insert (1) during manufacture and prior to installation is normally handled in the inverted condition relative to that illustrated in FIG. 17, the end surface which in use is adjacent to the combustion chamber (18) is referred to as the top of the insert (1).

Figure 4:
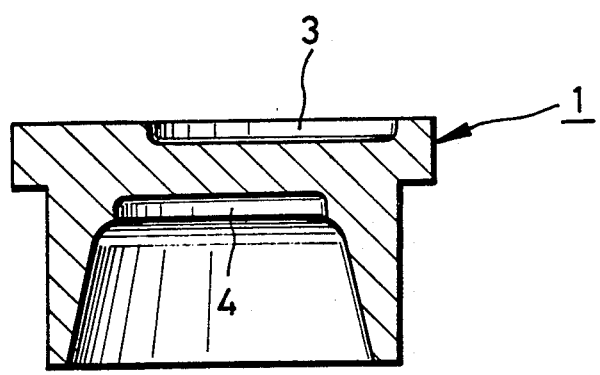
FIG. 4 is a vertical cross section before welding the alloy layer.
Figure 10:
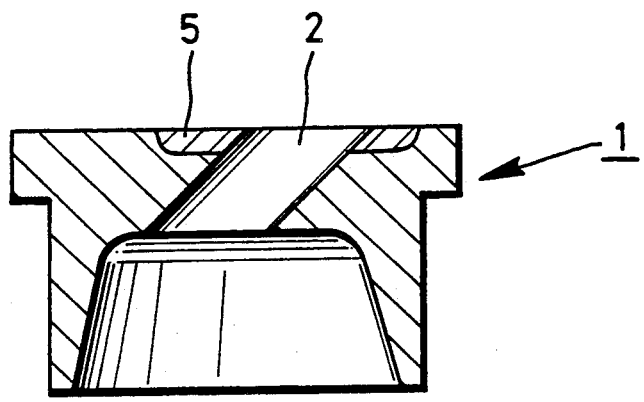
FIG. 10 is a vertical cross section of the insert in which the alloy layer surrounds only the upper end of the hole.
Figure 11:
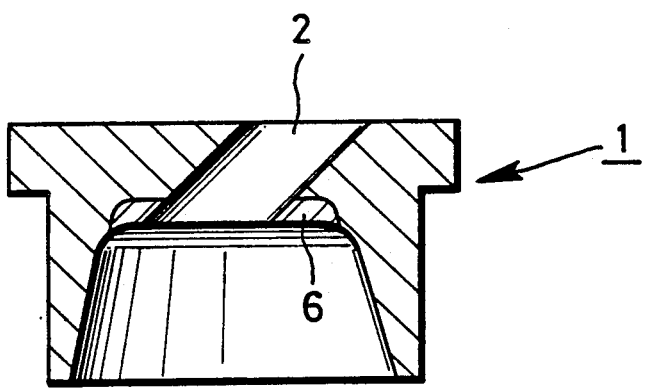
FIG. 11 is a vertical cross section of the insert in which the alloy layer surrounds only the lower end of the hole.

The method of manufacture of the preferred embodiment of an insert according to the invention comprises the following steps:

(i) As shown in FIG. 4, recesses (3) and (4) are formed on the upper and lower surfaces of the top wall of an insert body (1), either by a process of machining or by forging.

(ii) In the recesses (3) and (4), heat resistant alloys are welded to form alloy layers or welded overlays (5) and (6). The layers or overlays are then finished to flat surfaces by forging and have the appearance shown in FIGS. 5 and 6.

Figure 1:
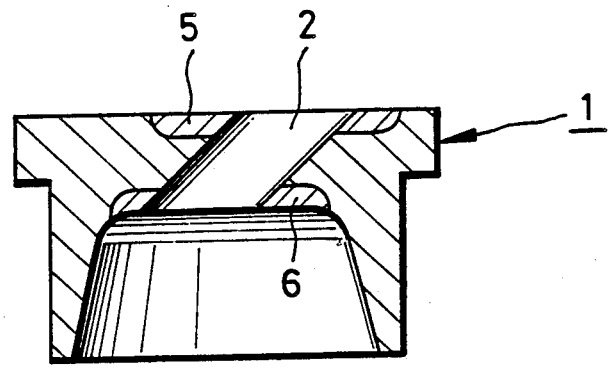
FIG. 1 is a vertical cross section of an insert according to the invention for an indirect injection diesel engine.
Figure 2:
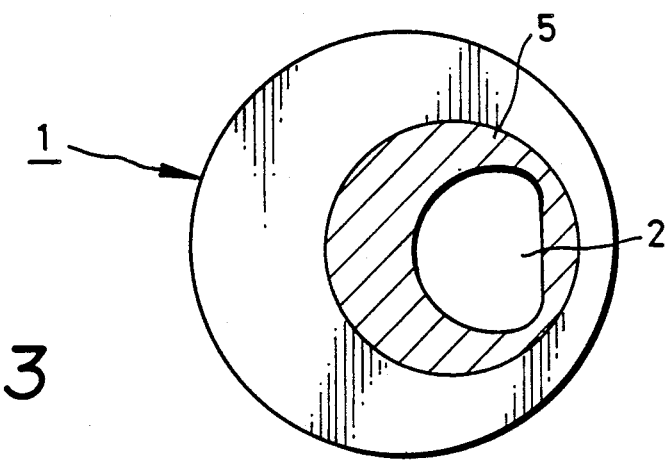
FIG. 2 is a plan view of FIG. 1.
Figure 3:
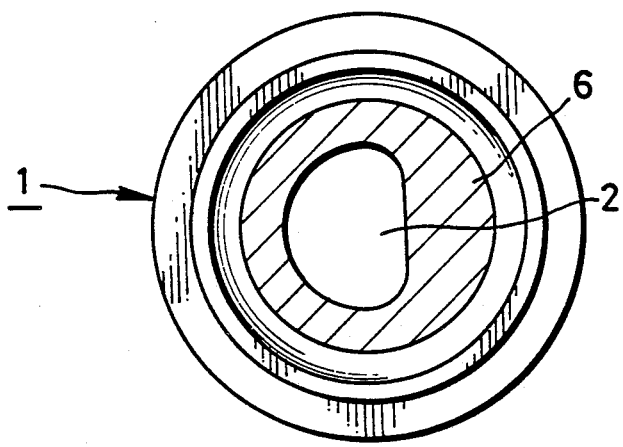
FIG. 3 is a bottom view of FIG. 1.

(iii) Finally the hole (2) is drilled as shown in FIGS. 1-3.

Tests may be performed on the inserts for comparison of their heat resistant properties. The test apparatus is shown in FIG. 7.

The test insert bodies (1) are fixed to the holders (11), shown in more detail in FIG. 8, which are installed on the test apparatus (10).

The test inserts (1) are heated from below with the gas burner (12) to about 900° C. After that, the test apparatus (10) is rotated and the inserts are moved above a sprayer (13). The inserts are cooled to about 40° C. by spraying with water, then air cooling follows. The cycles of heating and cooling, shown in FIG. 9, are repeated 300 and 600 times and after that, the lengths of cracks (7) and (8) shown in FIGS. 12 and 13, which are developed in the peripheral areas around the hole (2) are measured. The resistance to thermal fatigue is judged from the sum of the crack lengths. The crack lengths are also measured after 300 cycles for comparison.

EXAMPLE 1

The plasma welded overlay apparatus is used to obtain the heat resistant alloy layers 5 and 6 (FIGS. 1-3) having the composition of ($A_1$), ($A_2$), ($A_3$), ($B_1$), ($B_2$) and ($B_3$) as shown in Table I by welding the recesses 3 and 4, and the following alloy powders are used as the plasma metal materials.

|    | ($A_1'$) | ($A_2'$) | ($A_3'$) | ($B_1'$) | ($B_2'$) | ($B_3'$) |
|----|------|------|------|------|------|------|
| C  | 0.33 | 0.50 | 0.45 | 0.08 | 0.09 | 0.06 |
| Si | 0.87 | 0.60 | 0.99 | 0.28 | 0.30 | 0.16 |
| Mn | 2.01 | 1.00 | 2.01 | 0.59 | 0.71 | 0.48 |
| Cr | 22.0 | 16.51| 31.18| 15.65| 21.21| 27.65|
| Ni | 12.3 | 7.3  | 16.1 | Bal  | Bal  | Bal  |
| Mo | —    | —    | —    | 3.88 | 5.21 | 7.06 |
| W  | 12.5 | 15.1 | 20.9 | 8.35 | 5.30 | 4.00 |
| Fe | 6.71 | 6.5  | 12.82| 4.59 | 6.97 | 12.82|
| Co | Bal  | Bal  | Bal  | —    | —    | —    |

(In this Table, the alloy powders ($A_i'$) and ($B_i'$) are the materials used for obtaining ($A_i$) and ($B_i$) alloy layers shown in Table I ... i=1-3).

In the welded overlay operation, because the insert itself also melts the composition of the welded overlay layer obtained is different from the composition of plasma metal powder used, because the plasma metal powders are diluted with the melted alloy from the insert. When the welded overlay operation is performed at one time, 15% of the melted alloy from the insert itself is contained in the heat resistant alloy layer by weight. However, the welded overlay alloy layer obtained in the first operation is again welded with the plasma welded overlay operation by using the same alloy powder as used in the first operation with respect to ($A_2$) and ($B_2$) layers and the alloy layers as shown in Table 1 are obtained.

Figure 18:
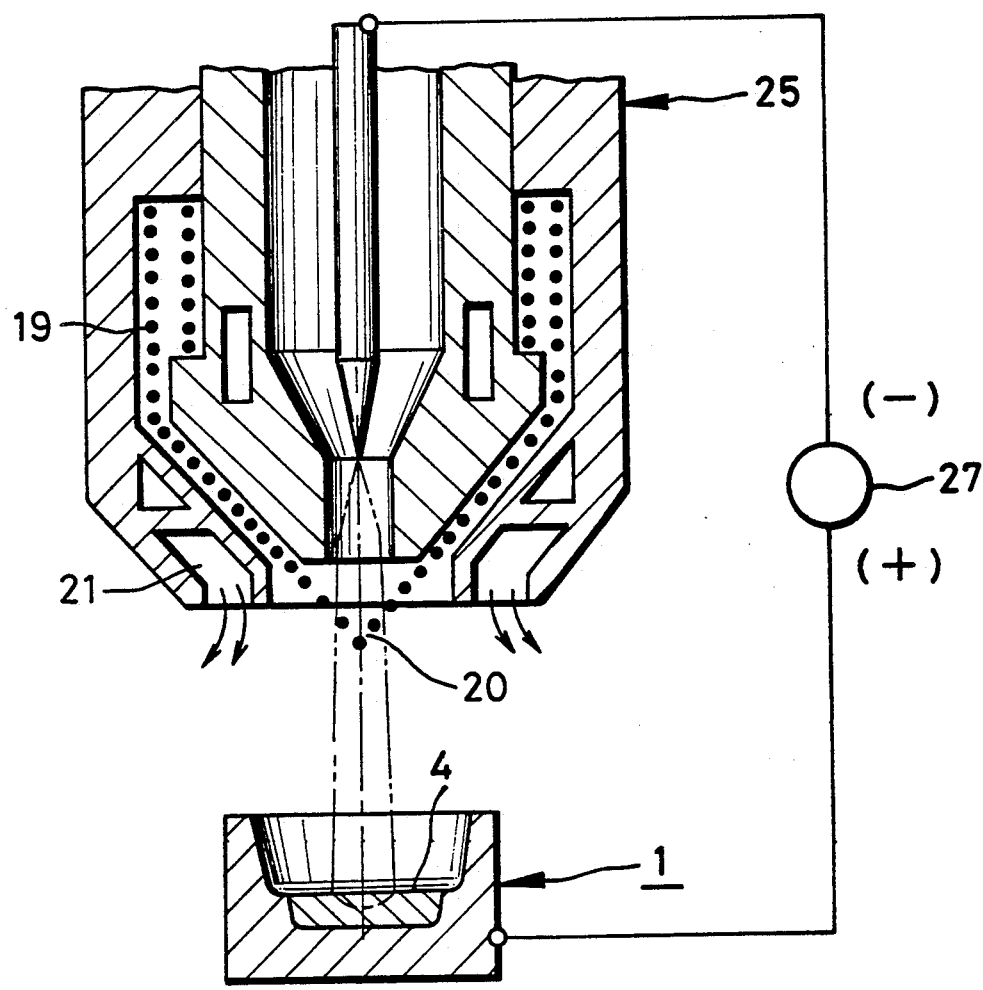
FIG. 18 is a schematic view of the plasma welded overlay apparatus used in this invention for obtaining the heat resistant alloy layer.
Figure 19:
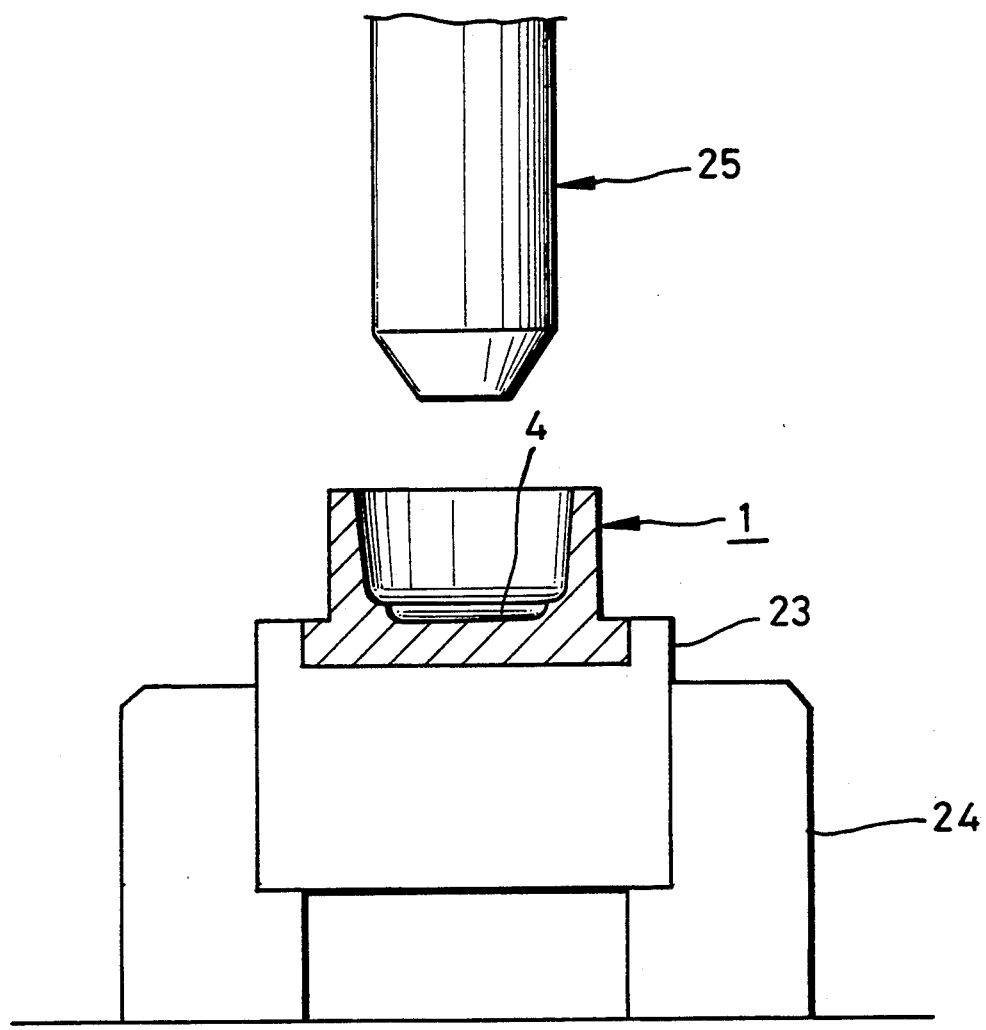
FIG. 19 is a set condition of the insert to the plasma welded overlay apparatus.

FIG. 18 is a schematic view of the plasma welded overlay apparatus used in this example. The plasma arc is 20, the shield gas route is 21, and the plasma torch is 25. Insert 1 is set on the jig 23 placed in the positioner 24 (FIG. 19). The recess 4 is overlay welded by the plasma metal powders 19. The electric current is raised with the supply of the powders, the insert is rounded to avoid the local heating, and the plasma torch is weaved, when welded. The electric current is sent without lowering the current after the supply of the powders is over to get a good fit between the welded overlay layer and the insert.

The operating conditions used in this example are as follows:

plasma gas: 2.5 l/min
shield gas: 15 l/min
carrier gas: 5 l/min
weaving: width 12 mm, 1 second/1 round trip
torch center: 4 mm from the center of the recess
positioner: 25 r.p.m.
supply speed of the powders: 0.3 g/sec
electric current: 140 A
electric voltage: 35 V

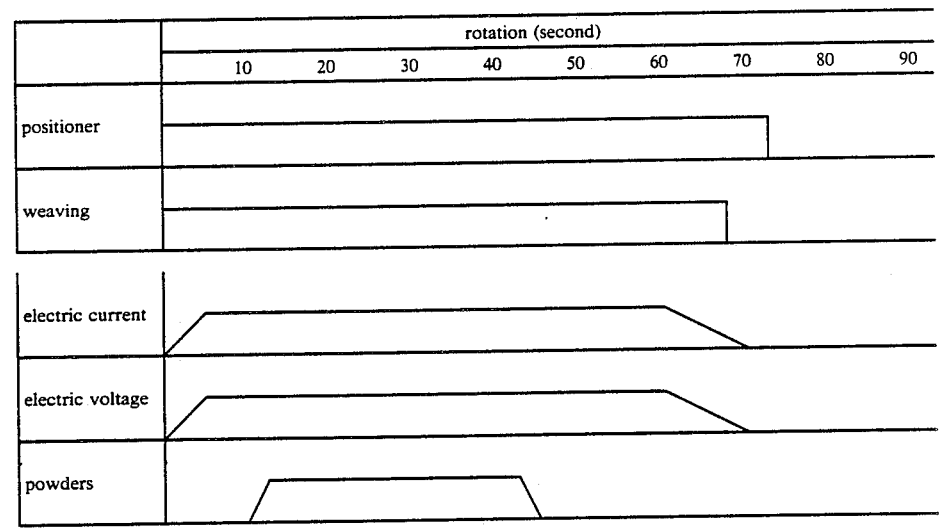

For comparison, inserts were also made using alloy C of Table I, by a cooling forging process, using alloy E of Table I, by a lost-wax casting process, and using alloy D.

These inserts were tested as described above.

The results after 300 cycles of heating were:

| $A_1$, $B_1$ Test | | | | |
|---|---|---|---|---|
| (mm) | | | | |
| $A_1$ | $B_1$ | C | D | E |

-continued

Figure 12:
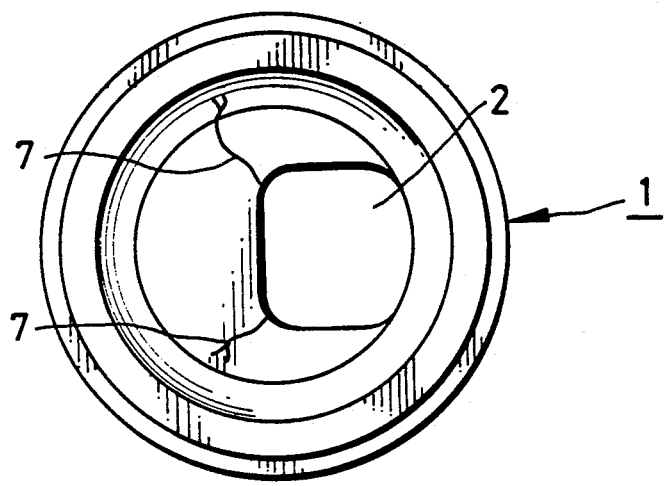
FIG. 12 is a bottom view in which cracks are developed.
Figure 13:
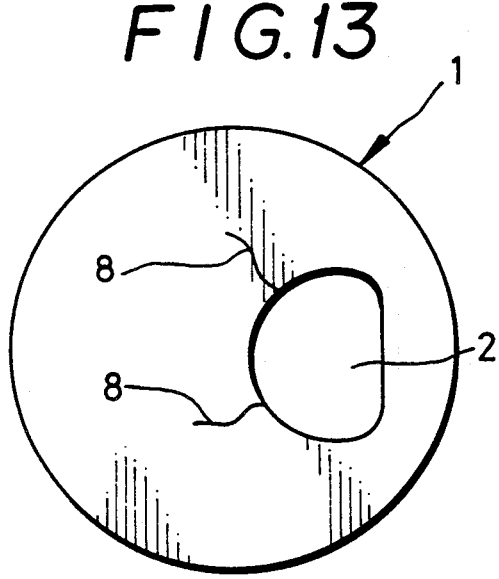
FIG. 13 is a plan view in which cracks are developed.

| | | | | | |
|---|---|---|---|---|---|
| Cracking as shown in FIG. 12 | none | none | 6.1 | 13.6 | 10.5 |
| Cracking as shown in FIG. 13 | none | none | 1.8 | 2.9 | 2.6 |

$A_2$, $B_2$ Test

| | $A_2$ | $B_2$ | C | D | E |
|---|---|---|---|---|---|
| Cracking as shown in FIG. 12 | none | none | 6.9 | 14.2 | 11.6 |
| Cracking as shown in FIG. 13 | none | none | 2.0 | 2.6 | 2.4 |

$A_3$, $B_3$ Test

| | $A_3$ | $B_3$ | C | D | E |
|---|---|---|---|---|---|
| Cracking as shown in FIG. 12 | none | none | 7.1 | 13.2 | 12.6 |
| Cracking as shown in FIG. 13 | none | none | 2.1 | 2.7 | 2.3 |

The results after 600 cycles of heating and cooling were:

$A_1$, $B_1$ Test (mm)

| | $A_1$ | $B_1$ | C | D | E |
|---|---|---|---|---|---|
| Cracking as shown in FIG. 12 | 1.0 | 4.0 | 10.5 | 19.3 | 19.3 |
| Cracking as shown in FIG. 13 | none | none | 2.7 | 5.0 | 5.1 |

$A_2$, $B_2$ Test

| | $A_2$ | $B_2$ | C | D | E |
|---|---|---|---|---|---|
| Cracking as shown in FIG. 12 | 1.1 | 4.6 | 11.2 | 19.0 | 18.3 |
| Cracking as shown in FIG. 13 | none | none | 2.9 | 5.1 | 4.8 |

$A_3$, $B_3$ Test

| | $A_3$ | $B_3$ | C | D | E |
|---|---|---|---|---|---|
| Cracking as shown in FIG. 12 | 0.9 | 4.9 | 12.3 | 18.9 | 19.6 |
| Cracking as shown in FIG. 13 | none | none | 3.0 | 5.3 | 5.2 |

TABLE I

| | | This invention | | | | | (weight %) comparison | | |
|---|---|---|---|---|---|---|---|---|---|
| materials | ($A_1$) | ($A_2$) | ($A_3$) | ($B_1$) | ($B_2$) | ($B_3$) | (C) | (D) | (E) |
| C | 0.12 | 0.3 | 0.5 | 0.4 | 0.09 | 0.09 | 0.07 | 0.06 | 0.04 | 0.12 |
| Si | 0.4 | 0.8 | 0.6 | 0.9 | 0.3 | 0.3 | 0.2 | 0.6 | 0.3 | 0.6 |
| Mn | 0.6 | 1.8 | 1.0 | 1.8 | 0.6 | 0.7 | 0.5 | 0.6 | 0.2 | 1.5 |
| Cr | 12.0 | 20.5 | 16.5 | 28.3 | 15.1 | 21.0 | 25.3 | 25.7 | 19.8 | 21.0 |
| Ni | — | 10.5 | 7.2 | 13.6 | Bal | Bal | Bal | 20.3 | Bal | 20.3 |
| Mo | — | — | — | — | 3.3 | 5.0 | 6.0 | — | — | 2.5 |
| W | — | 10.6 | 15.0 | 17.8 | 7.1 | 5.2 | 3.4 | — | — | 2.7 |
| Fe | Bal | 18.8 | 8.3 | 24.0 | 17.0 | 7.0 | 24.0 | Bal | 2.6 | Bal |
| Ti | — | — | — | — | — | — | | | 2.0 | — |
| Al | — | — | — | — | — | — | | | 1.2 | — |
| Co | — | Bal | Bal | Bal | — | — | — | | — | 19.8 |
| Nb + Ta | — | — | — | — | — | — | — | | — | 0.9 | materials: SUS403
comparison
(C): SUS310S
(D): NIMONIC80A
(E): LCN155

EXAMPLE 2

An insert having the heat resistant alloy layer (6) of $A_1$ and the heat resistant alloy layer (5) of $B_1$ was prepared by the above method, and the tests for thermal fatigue were performed using C, D and E as the controls.

The test results were:

| | 300 cycles | 600 cycles |
|---|---|---|
| Cracking as shown in FIG. 12 (mm) | | |
| ($A_1$)-($B_1$) of this invention | none | 1.0 |
| (C) | 6.8 | 11.6 |
| (D) | 13.1 | 19.6 |
| (E) | 11.9 | 20.0 |
| Cracking as shown in FIG. 13 (mm) | | |
| ($A_1$)-($B_1$) of this invention | none | none |
| (C) | 1.9 | 2.8 |
| (D) | 2.6 | 5.1 |
| (E) | 2.1 | 4.9 |

EXAMPLE 3

Figure 14:
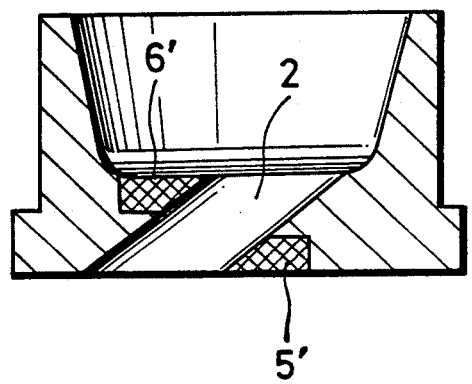
FIG. 14 is a vertical cross section in which the alloy layer is placed only on the acute angle parts around the hole, as described in the prior art documents, Japanese patent Nos. 62-112762 and 63-47346.
Figure 15:
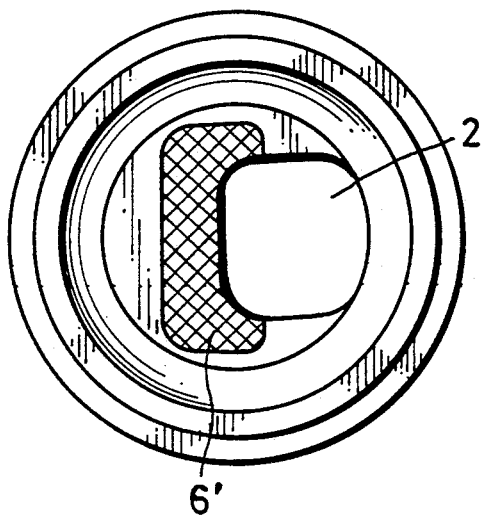
FIG. 15 is a plan view of FIG. 14.
Figure 16:
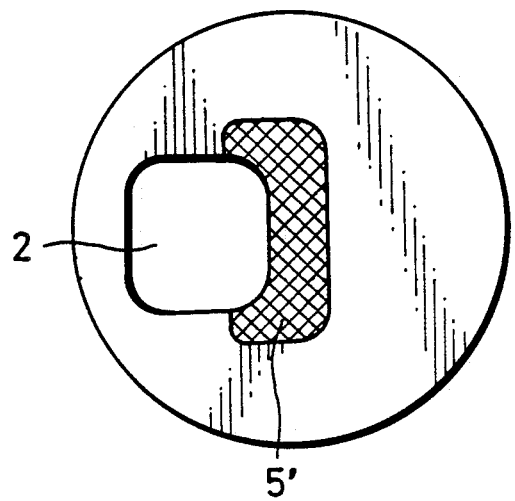
FIG. 16 is a bottom view of FIG. 14.

Inserts according to the prior art were made, in which the acute angle parts (5') and (6') around the hole (2) in FIGS. 14-16 were provided with $A_1$ and $B_1$ alloys as shown in Table I. Inserts according to this invention in which the whole area surrounding the hole (2) openings was provided with $A_1$ and $B_1$ just as in Example 2 were also produced. Then the thermal fatigue tests were performed as above.

The results were:
After 300 cycles, no cracks had developed.
After 600 cycles:

| | $A_1$ | $B_1$ |
|---|---|---|
| Current invention | 1.2 mm | 3.8 mm |
| Prior art | 1.1 mm | 3.8 mm |

From these results it may be deduced that the preferred heat resistant alloys of compositions A and B are much less susceptible to cracking indicative of thermal fatigue than are the known alloys C, D and E, when subjected to repeated heating and cooling.

Furthermore, Example 3 demonstrates that inserts wherein the heat resistant alloy surrounds the hole (2) openings are not significantly more degraded by thermal fatigue than the inserts of the prior art wherein the heat resistant alloy surrounds only the acute angles.

Therefore the inserts of the present invention are advantageous because they provide a uniform surface material when drilling the hole (2), resulting in greater precision.

We claim:

1. An insert for an indirect injection diesel engine, the insert comprising a cylindrical body having a top wall formed of heat resistant steel with a hole through the top wall, the upper and lower ends of the hole being surrounded by an alloy layer having a greater heat resistance than the top wall and comprising: up to 0.5% C; up to 1.0% Si; up to 2.0% Mn; 5-15% of Ni; 10-30% of Cr; 10-20% of W; 5-25% of Fe; and the balance Co, except for impurities.

2. An insert for an indirect injection diesel engine, the insert comprising a cylindrical body having a top wall formed of heat resistant steel with a hole through the top wall, the upper and lower ends of the hole being surrounded by an alloy layer having a greater heat resistance than the top wall and comprising: up to 0.5% C; up to 0.5% Si; up to 1.0% Mn; 10-30% of Cr; 3-7% of Mo; 3-10% of W; 5-25% of Fe and the balance Ni, except for impurities.

* * * * *